United States Patent
Segev et al.

(10) Patent No.: US 9,826,418 B2
(45) Date of Patent: Nov. 21, 2017

(54) APPARATUS, SYSTEM AND METHOD OF PERFORMING A TIME OF FLIGHT (TOF) MEASUREMENT

(71) Applicant: INTEL CORPORATION, Santa Clara, CA (US)

(72) Inventors: Jonathan Segev, Tel Mond (IL); Gaby Prechner, Rishon Lezion (IL); Shahar Michaelovich, Raanana (IL)

(73) Assignee: INTEL CORPORATION, Santa Clara, CA (US)

( * ) Notice: Subject to any disclaimer, the term of this patent is extended or adjusted under 35 U.S.C. 154(b) by 114 days.

(21) Appl. No.: 14/492,347

(22) Filed: Sep. 22, 2014

(65) Prior Publication Data

US 2016/0088497 A1 Mar. 24, 2016

(51) Int. Cl.
*H04W 24/02* (2009.01)
*H04W 56/00* (2009.01)
*G01S 13/76* (2006.01)
*G01S 11/08* (2006.01)

(52) U.S. Cl.
CPC .......... *H04W 24/02* (2013.01); *G01S 13/765* (2013.01); *H04W 56/00* (2013.01); *G01S 11/08* (2013.01)

(58) Field of Classification Search
CPC ..... H04W 24/02; H04W 56/00; G01S 13/765; G01S 11/08
See application file for complete search history.

(56) References Cited

U.S. PATENT DOCUMENTS

| | | | |
|---|---|---|---|
| 2008/0165059 A1* | 7/2008 | Karr | G01S 13/765 342/378 |
| 2013/0235852 A1* | 9/2013 | Segev | H04W 72/044 370/336 |
| 2014/0092918 A1* | 4/2014 | Jost | H04J 3/0661 370/465 |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
Wi-Fi Alliance Technical Committee P2P Task Group; Wi-Fi Peer-to-Peer (P2P) Technical Specification; Version 1.2; Dec. 14, 2011; 160 pages.

* cited by examiner

*Primary Examiner* — Walter Divito
(74) *Attorney, Agent, or Firm* — Shichrur & Co.

(57) ABSTRACT

Some demonstrative embodiments include apparatuses, systems and/or methods of performing a Time of Flight (ToF) measurement. For example, a first wireless device may include a controller to perform a Time of Flight (ToF) measurement procedure with a second wireless device; and a radio to communicate with the second wireless device a ToF frame including a first time value of a Time Synchronization Function (TSF) of a sender of the frame to indicate a beginning time of a ToF measurement period, and a second time value of the TSF at transmission of the ToF frame.

24 Claims, 6 Drawing Sheets

APPARATUS, SYSTEM AND METHOD OF PERFORMING A TIME OF FLIGHT (TOF) MEASUREMENT

TECHNICAL FIELD

Embodiments described herein generally relate to performing a Time of Flight (ToF) measurement.

BACKGROUND

Various applications use range information between devices.

The range information may enable, for example, users of the devices to meet new people and/or to use one or more services provided by the devices, e.g., when the devices are in proximity to each other. For example, a Smartphone can unlock a notebook, e.g., if the Smartphone is in within a predefined distance, e.g., 0.5 meters, from the notebook.

The range information may enable, for example, to estimate a location of a mobile device with respect to a coordinate set, for example, using a trilateration method.

The range information may be determined using a Time-of-Flight (ToF) measurement procedure. The ToF may be defined as the overall time a signal propagates from a first station to a second station and back to the first station. A distance between the first and second stations may be calculated based on the ToF value, for example, by dividing the ToF value by two and multiplying the result by the speed of light.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
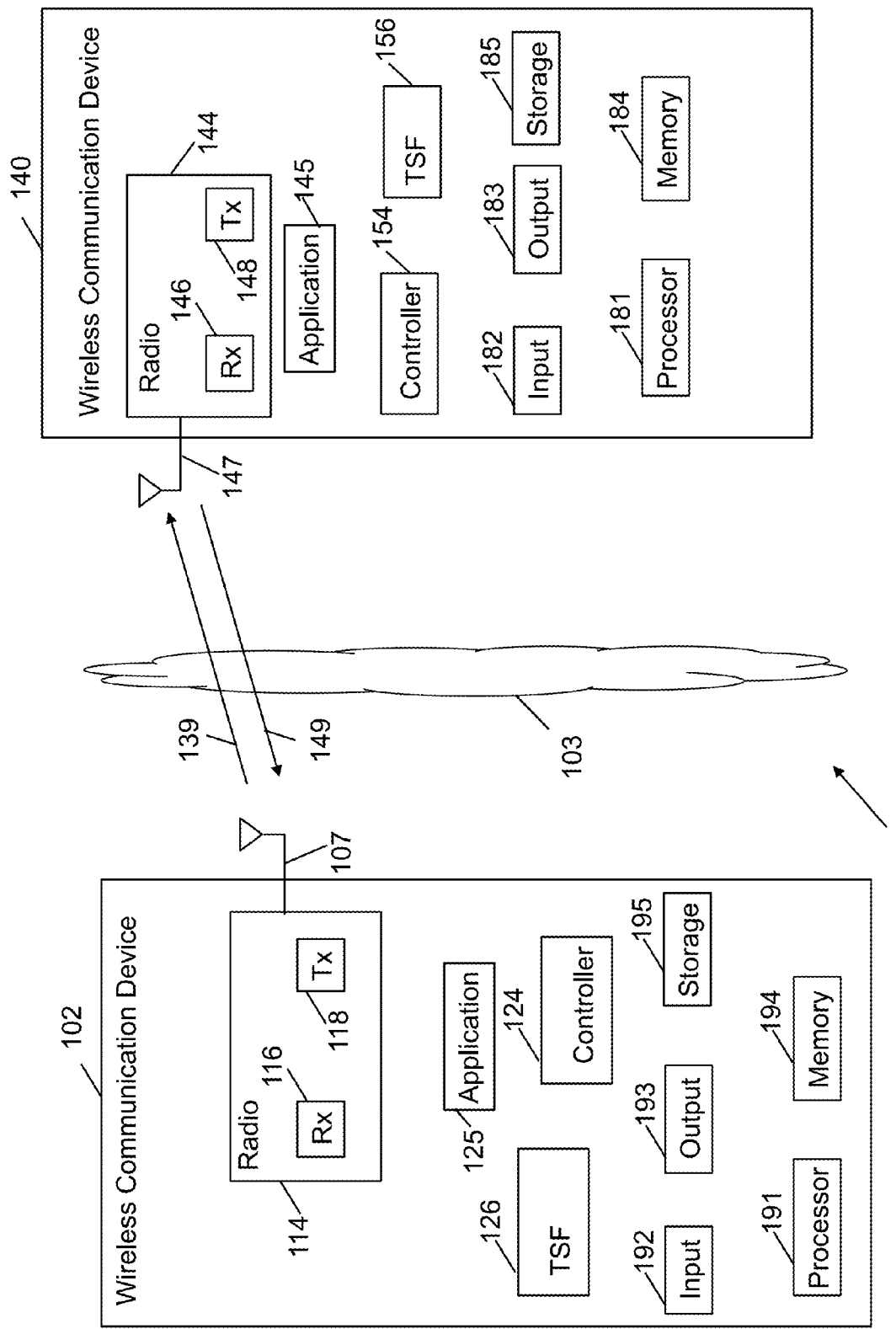
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless Fidelity (WiFi) Alliance (WFA) Specifications (including the WFA Neighbor Awareness Networking (NAN) Specification, and WFA Peer-to-Peer (P2P) specifications (*WiFi P2P technical specification, version* 1.2, 2012)) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE* 802.11-2012, *IEEE Standard for Information technology—Telecommunications and information exchange between systems Local and metropolitan area* networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec., 2012)) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102 and/or 140.

In some demonstrative embodiments, wireless communication devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, at least one device of devices 102 and 140 may include a mobile device. For example, device 102 may include a Smartphone, and/or device 140 may include an AP.

In one example, both devices 102 and 140 may include mobile devices. For example, device 102 may include a Smartphone, and/or device 140 may include a notebook.

In some demonstrative embodiments, device 102 may include, for example, one or more of a processor 191, an input unit 192, an output unit 193, a memory unit 194, and a storage unit 195; and/or device 140 may include, for example, one or more of a processor 181, an input unit 182, an output unit 183, a memory unit 184, and a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wireless Fidelity (WiFi) channel, an IR channel, a Bluetooth (BT) channel, and the like.

In some demonstrative embodiments, wireless communication medium 103 may include a wireless communication channel over a 2.4 Gigahertz (GHz) frequency band, or a 5 GHz frequency band, a millimeterWave (mmWave) frequency band, e.g., a 60 GHz frequency band, or any other frequency band.

In some demonstrative embodiments, devices 102 and 140 may include one or more radios to perform wireless communication between devices 102, 140 and/or one or more other wireless communication devices. For example, device 102 may include a radio 114, and/or device 140 may include a radio 144.

In some demonstrative embodiments, radios 114 and/or 144 may include one or more wireless receivers (Rx) to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include modulation elements, demodulation elements, amplifiers, analog to digital and digital to analog converters, filters, and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 may include a single antenna 147. In other example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, wireless communication devices 102 and/or 140 may form, or may communicate as part of, a wireless local area network (WLAN).

In some demonstrative embodiments, wireless communication devices 102 and/or 140 may form, or may communicate as part of, a WiFi network.

In some demonstrative embodiments, wireless communication medium 103 may include a direct link, e.g., a P2P link, for example, to enable direct communication between device 102 and device 140.

In some demonstrative embodiments, wireless communication devices 102 and/or 140 may perform the functionality of WFA P2P devices. For example, device 102 may perform the functionality of a P2P client device, and/or device 140 may perform the functionality of a P2P group owner (GO) device.

In some demonstrative embodiments, wireless communication devices 102 and/or 140 may form, or communicate as part of, a WiFi direct services (WFDS) network.

For example, device 140 may perform the functionality of a service advertiser and/or a service publisher, e.g., with respect to a first service, and/or device 102 may perform the functionality of a service seeker and/or service subscriber, e.g., with respect to the first service. Additionally or alternatively, device 102 may perform the functionality of a service advertiser and/or a service publisher, e.g., with respect to a second service, and/or device 140 may perform the functionality of a service seeker and/or service subscriber, e.g., with respect to the second service.

In some demonstrative embodiments, at least one device of wireless communication devices 102 and 140 may be part of a WiFi Neighbor Awareness Networking (NAN) network. For example, device 102 may include a NAN device, which may be part of a NAN network, while device 140 may not include a NAN device and may not be part of a NAN network.

In other embodiments, wireless communication devices 102 and/or 140 may form any other network.

In some demonstrative embodiments, devices 102 may include one or more applications configured to provide and/or to use one or more location based services over WM 103, e.g., a social application, a navigation application, a location based advertising application, and/or the like. For example, device 102 may include an application 125 to be executed by device 102.

In some demonstrative embodiments, application 125 may use range information between devices 102 and 140, for example, to determine an estimated location of device 102, e.g., with respect to a coordinate system, e.g., a World Geodetic System 1984 (WGS84), and/or a local coordination.

In one example, device 102 may include a Smartphone and device 140 may include an AP, which is located in a shop, e.g., in a shopping mall. According to this example, application 125 may use the range information to determine a relative location of device 102 with respect to device 140, for example, to receive sale offers from the shop.

In some demonstrative embodiments, devices 102 and/or 140 may perform a range measurement procedure to determine the range information between devices 102 and 140.

In some demonstrative embodiments, the range measurement procedure may include a Time of Flight (ToF) measurement procedure, e.g., as described below, or any other range measurement procedure.

The ToF may be defined as the overall time a signal propagates from a first station, e.g., device 102, to a second station, e.g., device 140, and back to the first station. A distance between the first and second stations may be determined based on the ToF value, for example, by dividing the ToF value by two and multiplying the result by the speed of light.

In some demonstrative embodiments, the ToF measurement procedure may include a Fine Timing Measurement (FTM) procedure. In some demonstrative embodiments, device 102 may initiate the ToF measurement procedure. For example, device 102 may perform the functionality of an initiator device, e.g., as described below with reference to FIG. 2.

In other embodiments, device 140 may initiate the ToF measurement procedure, for example, device 140 may perform the functionality of the initiator device.

Figure 2:
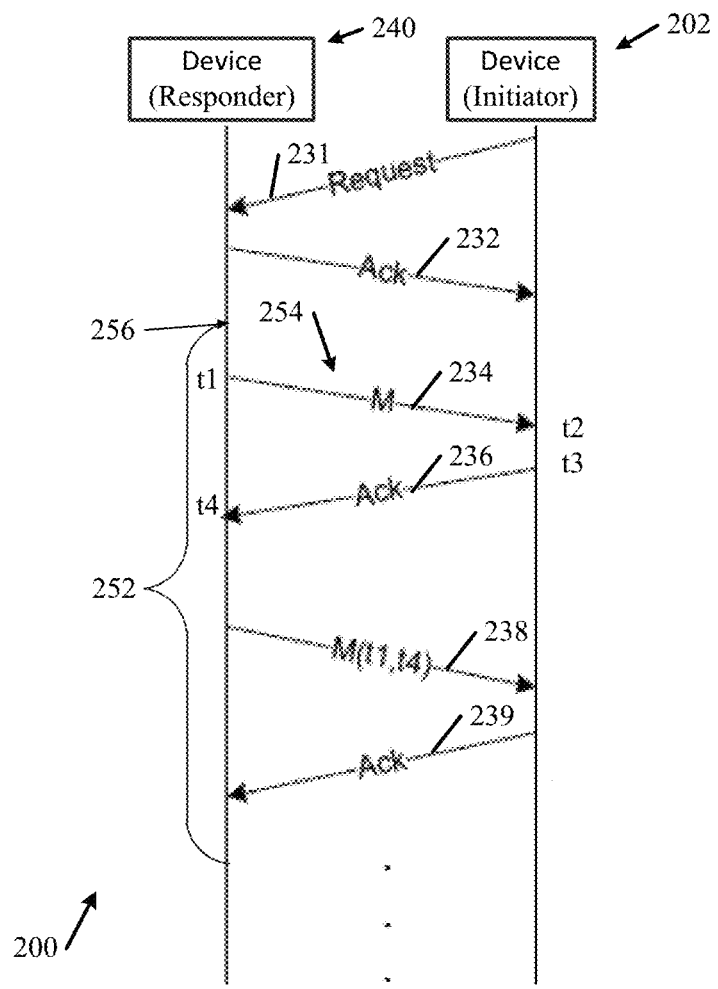
FIG. 2 is a schematic illustration of a Fine Time Measurement (FTM) procedure, in accordance with some demonstrative embodiments.

Reference is made to FIG. 2, which schematically illustrates a sequence diagram, which demonstrates operations and interactions between a first wireless communication device 202 (Initiating STA) and a second wireless communication device 240 (Responding STA), of an FTM procedure 200, in accordance with some demonstrative embodiments. For example, device 202 may perform the functionality of device 102 (FIG. 1), and/or device 240 may perform the functionality of device 140 (FIG. 1).

As shown in FIG. 2, device 202 may transmit to device 240 an FTM request message 231 to request to perform the FTM procedure 200 with device 240.

As shown in FIG. 2, device 240 may transmit an FTM request acknowledgement (ACK) 232 to device 202, to acknowledge receipt of the FTM request message 231, and to confirm the request to perform the FTM procedure.

As shown in FIG. 2, FTM procedure 200 may include an FTM measurement period 252, during which devices 202 and 240 may communicate FTM measurement frames 254, e.g., as described below.

In some demonstrative embodiments, FTM measurement period 252 may include a burst timeout period, e.g., as described below.

In some demonstrative embodiments, devices 202 and/or 240 may communicate FTM measurement frames 254 between devices 202 and 240 during FTM measurement period 252, for example, to determine a ToF value between devices 202 and 240.

In some demonstrative embodiments, devices 202 and/or 240 may communicate FTM measurement frames 254 via a channel ("the measurement channel") over WM 103 (FIG. 1) during the FTM measurement period 252.

In some demonstrative embodiments, during the ToF measurement period, devices 202 and/or 240 may switch to the measurement channel, for example, from a current operating channel, to communicate FTM measurement frames 254 between devices 202 and 240.

As shown in FIG. 2, device 202 may set FTM measurement period 252 to begin at a time ("the beginning time") 256.

As shown in FIG. 2, device 240 may transmit a message 234 to device 202, at a time, denoted t1. The time t1 may be a Time of Departure (ToD), denoted ToD(M), of message 234.

As shown in FIG. 2, device 202 may receive message 234 and may determine a time, denoted t2, e.g., by determining a Time of Arrival (ToA), denoted ToA(M), of message 234.

As shown in FIG. 2, device 202 may transmit a message 236 to device 240, at a time, denoted t3. Message 236 may include, for example, an acknowledgement message transmitted in response to message 234. The time t3 may be a ToD, denoted ToD(ACK), of the message 236.

As shown in FIG. 2, device 240 may receive message 236 and may determine a time, denoted t4, e.g., by determining a ToA, denoted ToA(ACK), of message 236.

As shown in FIG. 2, device 240 may transmit a message 238 to device 202. Message 238 may include, for example, information corresponding to the time t1 and/or the time t4. For example, message 238 may include a timestamp, e.g., a ToD timestamp, including the time t1, and a timestamp, e.g., a ToA timestamp, including the time t4.

As shown in FIG. 2, device 202 may receive message 238. Device 202 may determine a ToF between device 202 and device 240, for example, based on message 238.

For example, device 202 may determine the ToF based on an average, or any other function, applied to the time values t1, t2, t3 and t4. For example, device 202 may determine the ToF, e.g., as follows:

$$ToF=[(t4-t1)-(t3-t2)]/2 \quad (1)$$

As shown in FIG. 2, device 202 may transmit a message 239 to device 240. Message 239 may include, for example, an acknowledge message transmitted in response to message M(t1,t4).

In some demonstrative embodiments, device 202 may determine the distance between devices 202 and 240 based on the calculated ToF.

For example, device 202 may determine the distance, denoted $r_k$, e.g., as follows:

$$r_k=ToF*C \quad (2)$$

wherein C denotes the radio wave propagation speed.

Referring back to FIG. 1, In some demonstrative embodiments, devices 102 and/or 140 may include a controller configured to perform and/or to coordinate the ToF measurement procedure between devices 102 and 140, e.g., to enable device 102 to estimate the location of device 102. For example, device 102 may include a controller 124, and/or device 140 may include a controller 154.

In some demonstrative embodiments, controllers 124 and/or 154 may include circuitry, e.g., processor circuitry, memory circuitry, Media-Access Control (MAC) circuitry, Physical Layer (PHY) circuitry, and/or any other circuitry, configured to perform the functionality of controllers 124 and/or 154. Additionally or alternatively, one or more functionalities of the controllers 124 and/or 154 may be implemented by logic, which may be executed by a machine and/or one or more processors, e.g., as described below.

In some demonstrative embodiments, devices 102 and/or 140 may coordinate and/or negotiate a beginning time of a ToF measurement period, for example, to enable devices 102 and/or 140 to switch to a measurement channel to be used to communicate ToF measurement frames during the ToF measurement period. In one example, devices 102 and/or 140 may coordinate and/or negotiate beginning time 256 (FIG. 2), for example, to enable devices 102 and/or 140 to switch to the measurement channel to be used to communicate FTM measurement frames 254 (FIG. 2) during FTM measurement period 252 (FIG. 2).

In some demonstrative embodiments, devices 102 and/or 140 may coordinate and/or negotiate the beginning time of the ToF measurement period, for example, via at least one ToF frame of the ToF measurement procedure.

In one example, device 140 may set the beginning time, and may communicate the beginning time in a ToF response message 149 from device 140 to device 102. For example, ToF response frame 149 may perform the functionality of message 234 (FIG. 2).

In another example, device 102 may request a preferred beginning time to begin the ToF measurement period, and may communicate the preferred beginning time in a ToF request frame 139 from device 102 to device 140. For example, ToF request frame 139 may perform the functionality of FTM request message 231 (FIG. 2). According to this example, device 140 may set the beginning time, e.g., by accepting the request for the preferred beginning time or by setting another beginning time, and may communicate the beginning time via ToF response frame 149.

In some demonstrative embodiments, device 140 may provide the beginning time in the form of a local time of device 140.

In some demonstrative embodiments, device 140 may include a Time Synchronization Function (TSF) 156 to manage the local time of device 140.

In some demonstrative embodiments, TSF 156 may include a counting timer, e.g., including a 48 bit value, which may incremented, for example by one every one microsecond (us). In other embodiments, device 140 may include any other form of local timer.

In some demonstrative embodiments, device 140 may provide the beginning time in terms of a time value of TSF 156.

In some demonstrative embodiments, the beginning time may include a partial TSF timer value.

In some demonstrative embodiments, device 140 may provide the beginning time in the form of a portion of TSF 156, for example, a predefined number, e.g., 20 bits, of the 48 bits of TSF 156.

In one example, the beginning time may include a predefined number of least significant bits (LSBs) of TSF 156.

In another example, the beginning time may include a predefined number of most significant bits (MSBs) of TSF 156.

In another example, the beginning time may include a predefined number of bits in any other bit positions of TSF 156.

In some demonstrative embodiments, device 102 may provide the preferred beginning time according to a local time of device 102.

In some demonstrative embodiments, device 102 may include a Time Synchronization Function (TSF) 126 to manage the local time of device 102.

In some demonstrative embodiments, TSF 126 may include a counting timer, e.g., including a 48 bit value, which is incremented, for example by one every one microsecond (us). In other embodiments, device 102 may include any other form of local timer.

In some demonstrative embodiments, device 102 may provide the preferred beginning time in terms of a time value of TSF 126.

In some demonstrative embodiments, the preferred beginning time may include a partial TSF timer value.

In some demonstrative embodiments, device 102 may provide the preferred beginning time in the form of a portion of TSF 126, for example, a predefined number, e.g., 20 bits, of the 48 bits of TSF 126.

In one example, the preferred beginning time may include a predefined number of least significant bits (LSBs) of TSF 126.

In another example, the preferred beginning time may include a predefined number of most significant bits (MSBs) of TSF 126.

In another example, the preferred beginning time may include a predefined number of bits in any other bit positions of TSF 126.

In some demonstrative embodiments, device 102 may not be able to accurately determine the beginning time, e.g., based on the beginning time provided by device 140, for example, if device 102 is not able to determine the local time of device 140.

In one example, at a certain time, the TSF value of TSF 156 may be 100 time units (TU), while the TSF value of TSF 126 may be 110 TU. Controller 154 may set the beginning time to begin at a TSF value of 126 TU of TSF 146, and may send to device 102 an indication that the beginning time is set to the TSF value of 126 TU. According to this example, the beginning time of the ToF measurement period may be set to occur when TSF 126 reaches the time value of 136 TU. However, device 102 may not be able to determine the beginning time in terms of TSF 126, for example, if device 102 does not have knowledge of the local time of device 140.

In some demonstrative embodiments, device 140 may not be able to accurately determine the preferred beginning time, e.g., based on the preferred beginning time provided by device 102, for example, if device 140 is not able to determine the local time of device 102.

In one example, controller 124 may request from controller 154 to begin the ToF measurement period at a preferred beginning time of 126 TU. According to this example, the beginning time may occur when TSF 146 reaches a time value of 116 TU. However, device 140 may not be able to determine the preferred beginning time, for example, if device 140 does not know the local time of device 102.

In some demonstrative embodiments, exchanging information of the local time between devices 102 and 140 as part of dedicated communications and/or as part of active and/or passive scan communications may result in an increased power consumption from devices 102 and 140, and/or an increased usage of WM 103.

In one example, performing an active or passive scan to communicate the local time of devices 102 and/or 140, e.g., as part of beacons, probe requests and/or probe responses, may increase power consumption of device 102 and/or 140 and/or may increase usage of WM 103.

In some demonstrative embodiments, device 102 may perform ranging measurements with a plurality of devices and, accordingly, may be required to determine and/or maintain the local time of the plurality of devices, e.g., as described below.

In some demonstrative embodiments, device 102 may determine the estimated location of device 102 based on two or more ToF values and/or range values, e.g., according to Equations 1 and/or 2, with respect to two or more devices, e.g., at least three or four other devices, and may determine the location of device 102 based on the two or more ToF values, for example, by trilateration.

In some demonstrative embodiments, device 102 may perform two or more ToF measurement procedures to determine the two or more ToF values and/or range values.

In some demonstrative embodiments, the two or more ToF measurement procedures may enable device 102 to determine the estimated location of device 102, e.g., based on two or more ToF values, for example, by trilateration.

In some demonstrative embodiments, device 102 may maintain local times of the plurality of devices, for example, in order to perform the two or more ToF measurement procedures, e.g., as described below with reference to FIG. 3.

Figure 3:
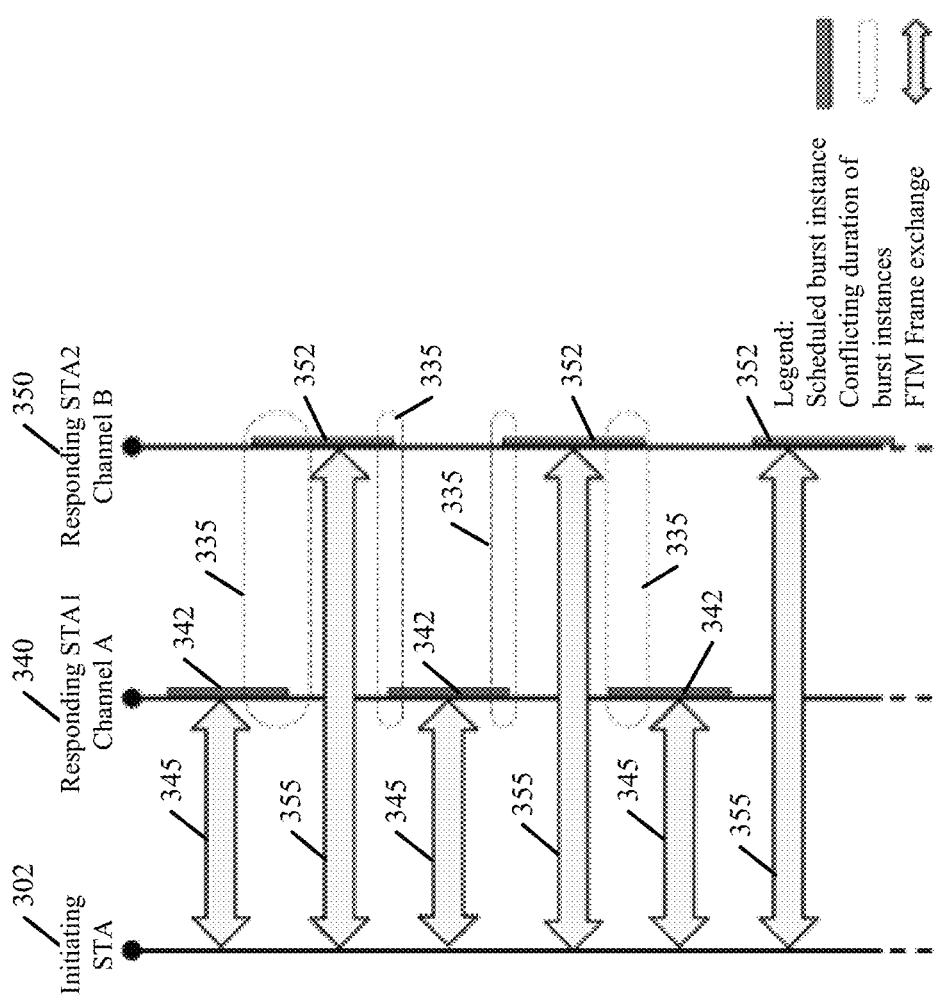
FIG. 3 is a schematic sequence diagram of operations and interactions between an initiating station and two responding stations, in accordance with some demonstrative embodiments.

Reference is made to FIG. 3, which schematically illustrates a sequence diagram 300 of operations and interactions to perform ToF measurements between an initiating station (STA) 302 and two responding stations, e.g., a first responding station 340, and a second responding station 350, in accordance with some demonstrative embodiments. For example, device 340 may perform the functionality of device 102 (FIG. 1), and/or each of devices 340 and/or 350 may perform the functionality of device 140 (FIG. 1).

As shown in FIG. 3, device 340 may allocate ToF measurement periods 342 to communicate ToF measurement frames 345 over a first channel ("Channel A").

As shown in FIG. 3, device 350 may allocate ToF measurement periods 352 to communicate ToF measurement frames 355 over a second channel ("Channel B").

As shown in FIG. 3, ToF measurement periods 342 may not be synchronized with ToF measurement periods 352, for example, if a local time of device 340 is not synchronized with a local time of device 350.

As shown in FIG. 3, sequence 300 may include conflicting durations 235, for example, since measurement periods 342 and 352 are not synchronized.

In some demonstrative embodiments, device 302 may maintain the local times of devices 340 and 350, for example, to determine when to switch to channel A to communicate ToF measurement frames 345 with device 340, and/or to determine when to switch to channel B to communicate ToF measurement frames 355 with device 350.

Referring back to FIG. 1, in some demonstrative embodiments, device 140 may provide to device 102 an indication of the local time of device 140, and/or device 102 may provide to device 140 an indication of the local time of device 102, for example, even without the need to perform a passive or active scan, e.g., as described below.

In some demonstrative embodiments, devices 102 and/or 140 may utilize a ToF frame of the ToF measurement procedure between devices 102 and 140 to communicate the local time of devices 102 and/or 140, for example, instead of performing the active and/or passive scan, e.g., as described below.

In some demonstrative embodiments, devices 102 and 104 may communicate a ToF frame including the local time of the sender of the ToF frame.

In some demonstrative embodiments, device 140 may transmit to device 102 a ToF frame, e.g., ToF response frame 149, including the local time of device 140, e.g., as described below.

In some demonstrative embodiments, ToF response frame 149 may include a time value of TSF 146 at transmission of ToF response frame 149.

In some demonstrative embodiments, ToF response frame 149 may include a time value of a portion of TSF 146, which indicates beginning time 256 (FIG. 2).

In some demonstrative embodiments, device 102 may transmit to device 140 a ToF frame, e.g., ToF request frame 139, including the local time of device 102, e.g., as described below.

In some demonstrative embodiments, ToF request frame 139 may include a time value of TSF 126 at transmission of ToF request frame 139.

In some demonstrative embodiments, ToF request frame 139 may include a time value of the portion of TSF 126, which indicates the preferred beginning time.

Figure 4:
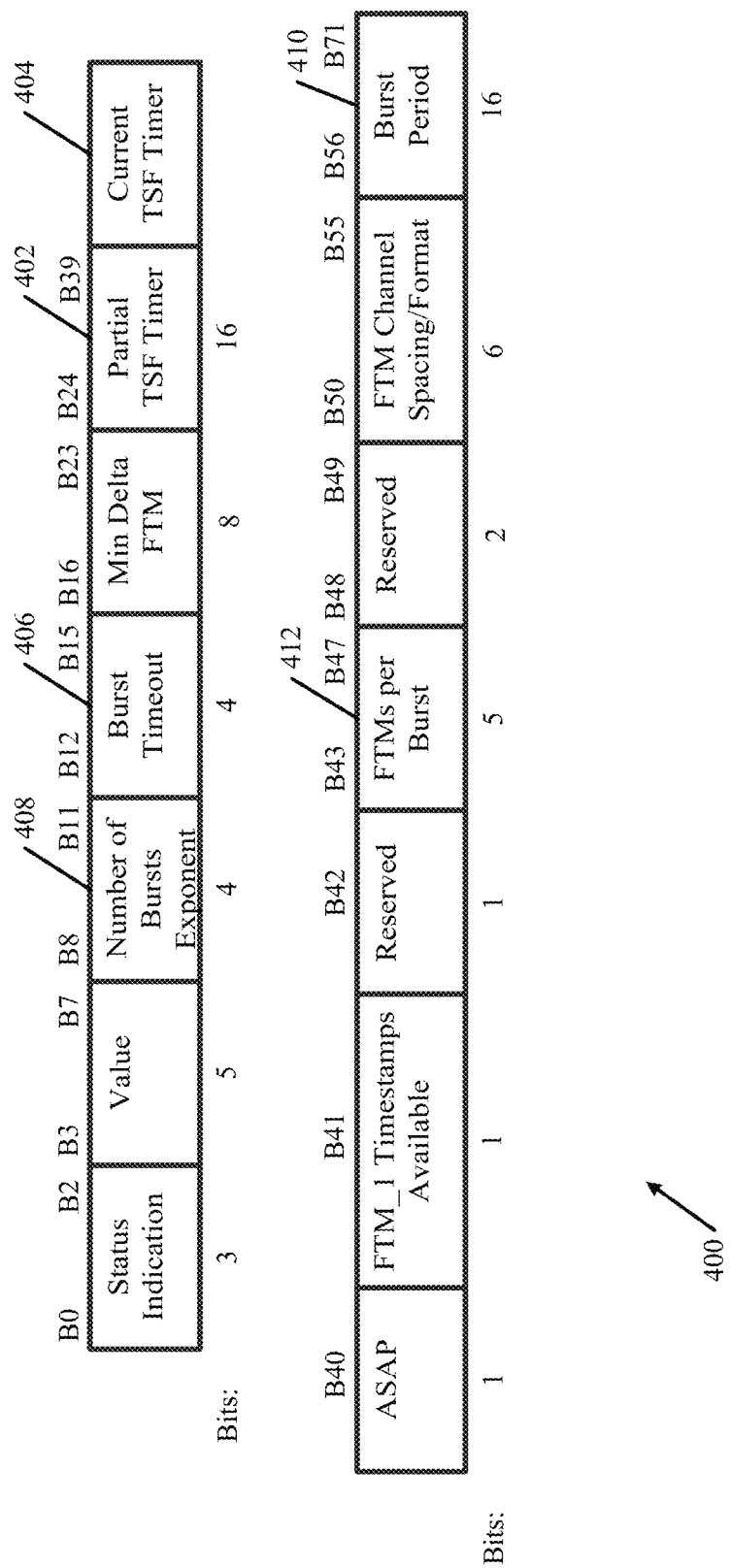
FIG. 4 is a schematic illustration of an FTM parameter field, in accordance with some demonstrative embodiments.

Reference is made to FIG. 4, which schematically illustrate an FTM parameter field 400, in accordance with some demonstrative embodiments.

In some demonstrative embodiments, FTM parameter field 400 may be included as part of ToF response frame 149 (FIG. 1) and/or ToF request frame 139 (FIG. 1).

As shown in FIG. 4, FTM Parameter field 400 may include a partial TSF timer field 402. In one example, TSF timer field 402 may include the beginning time 256 (FIG. 2), e.g., if FTM Parameter field 400 is included in a ToF response frame, e.g., frame 149 (FIG. 1). In another example, TSF timer field 402 may include the preferred beginning time, e.g., if FTM Parameter field 400 is included in a ToF request frame, e.g., frame 139 (FIG. 1).

As shown in FIG. 4, FTM Parameter field 400 may include a current TSF time field 404 to include the local time of a sender of a frame including FTM Parameter field 400. In one example, TSF time field may include the current time of TSF 126 (FIG. 1), e.g., if FTM Parameter field 400 is transmitted by device 102 (FIG. 1). In another example, TSF time field may include the current time of TSF 156 (FIG. 1), e.g., if FTM Parameter field 400 is transmitted by device 140 (FIG. 1).

As shown in FIG. 4, FTM Parameter field 400 may include a burst time out field 406 to include the duration of FTM measurement period 252 (FIG. 2).

As shown in FIG. 4, FTM Parameter field 400 may include a filed ("number of bursts exponent") 408 to include a number of repetitions of FTM measurement period 252 (FIG. 2).

In some demonstrative embodiments, the field 408 may include an exponent value, e.g., 1, 2, 4, 8, or the like.

As shown in FIG. 4, FTM Parameter field 400 may include a burst period field 410 to include a time period between the repetitions of FTM measurement period 252 (FIG. 2).

As shown in FIG. 4, FTM Parameter field 400 may include a field ("FTMs per burst") 410 to include a number of FTM measurement frames 254 (FIG. 2) to be communicated during FTM measurement period 252 (FIG. 2).

In some demonstrative embodiments, the local time value of the sender of the ToF frame may be included as part of a field, e.g., filed 404, of the FTM parameter field 400, e.g., as described above.

In other embodiments, the local time value of the sender of the ToF frame may be included as part of any other field, Information Element (IE), sub-element, and/or attribute. In one example, the local time value of the sender of the ToF frame may be included as part of a dedicated field, IE, sub-element, and/or attribute.

In one example, the local time value of the sender of the ToF frame may be included as part of a dedicated sub-element of the ToF frame, e.g., as follows:

TABLE 1

| Subelement ID | Length | Current TSF timer |
| --- | --- | --- |

Referring back to FIG. 1, in some demonstrative embodiments, transmitter 116 may transmit ToF request frame 139 to device 140.

In some demonstrative embodiments, device 140 may receive ToF request frame 139, and may transmit FTM request acknowledgement (ACK) 232 (FIG. 2) to device 102, e.g., to acknowledge receipt of ToF request frame 139.

In some demonstrative embodiments, transmitter 146 may transmit ToF response frame 149 to device 102.

In some demonstrative embodiments, ToF response frame 149 may include a beginning time value to indicate the beginning time of the ToF measurement period 252 (FIG. 2).

In some demonstrative embodiments, ToF response frame 149 may include a local time value including a time value of TSF 146 at transmission of ToF response frame 149. In one example, ToF response frame 149 may include FTM Parameter field 400 (FIG. 4) including filed 404 having the local time value of TSF 146.

In some demonstrative embodiments, receiver 116 may receive ToF response frame 149.

In some demonstrative embodiments, controller 124 may determine the local time of device 140, for example, based on the local time value in ToF response frame 149.

In some demonstrative embodiments, controller 124 may begin the ToF measurement period based on the beginning time value, the local time of device 140 and a time value of TSF 126. For example, controller 124 may determine the beginning time in terms of local TSF 126, for example, based on the beginning time in field 406 (FIG. 4), the local time in field 404 (FIG. 4), and a local time value of TSF 126, e.g., at receipt of ToF response frame 149. In one example, controller 124 may determine the beginning time in terms of local TSF 126, for example, by deducting the local time in field 404 (FIG. 4) from the beginning time in field 406 (FIG. 4), and adding to the result the local time value of TSF 126, e.g., at receipt of ToF response frame 149.

In some demonstrative embodiments, transmitter 116 may transmit ToF request frame 139 to device 140.

In some demonstrative embodiments, ToF request frame 139 may include the preferred beginning time requested by the initiator, e.g., device 102, for the ToF measurement period.

In some demonstrative embodiments, ToF request frame 139 may include the preferred beginning time to indicate the preferred beginning time requested by device 102.

In some demonstrative embodiments, ToF request frame 139 may include a local time value including a time value of TSF 126 at transmission of ToF request frame 139. In one example, ToF response frame 149 may include FTM Parameter field 400 (FIG. 4) including filed 404 having the local time value of TSF 126.

In some demonstrative embodiments, receiver 146 may receive ToF request frame 139.

In some demonstrative embodiments, controller 154 may determine the local time of device 102, for example, based on the local time in ToF request frame 139.

In some demonstrative embodiments, controller 154 may set the beginning time of the ToF measurement period, for example, based on the preferred beginning time included in ToF request frame 139, and the local time of device 102. For example, controller 154 may determine the preferred beginning time in terms of local TSF 156, for example, based on the beginning time in field 406 (FIG. 4), the local time in field 404 (FIG. 4), and a local time value of TSF 156, e.g., at receipt of ToF request frame 139. In one example, controller 154 may determine the preferred beginning time in terms of local TSF 156, for example, by deducting the local time in field 404 (FIG. 4) from the beginning time in field 406 (FIG. 4), and adding to the result the local time value of TSF 156, e.g., at receipt of ToF request frame 139.

In some demonstrative embodiments, communicating a ToF frame including the local time value of the sender of the ToF frame, e.g., as described above, may enable devices 102 and 140 to synchronize the beginning time of the ranging measurement period, e.g., FTM measurement period 252 (FIG. 2), for example, even without performing an active and/or passive scan between devices 102 and 140.

In some demonstrative embodiments, communicating the ToF frame including the local time value of the sender of the ToF frame may help preserve power at devices 102 and/or 140, for example, compared to a power consumption of devices 102 and/or 140, when performing the active and/or passive scan in order to communicate the local times of devices 102 and 140.

In some demonstrative embodiments, communicating the ToF frame including the local time value of the sender of the ToF frame may enable reducing the usage of WM 103, for example, compared to usage of WM 103, when performing the active and/or passive scan in order to communicate the local times of devices 102 and 140.

In some demonstrative embodiments, communicating the ToF frame including the local time value of the sender of the ToF frame may improve responsiveness of devices 102 and/or 140, for example, compared to communicating the local time via beacons of the active and/or passive scan, which may bare a delay, e.g., by 100 milliseconds (msec) delay period, e.g., when active scanning is not allowed.

In some demonstrative embodiments, communicating the ToF frame including the local time value of the sender of the ToF frame may enable synchronization of the beginning time 256 (FIG. 2), between two devices, which are not part of a NAN network, and/or between two NAN client devices that do not share a cluster TSF.

Figure 5:
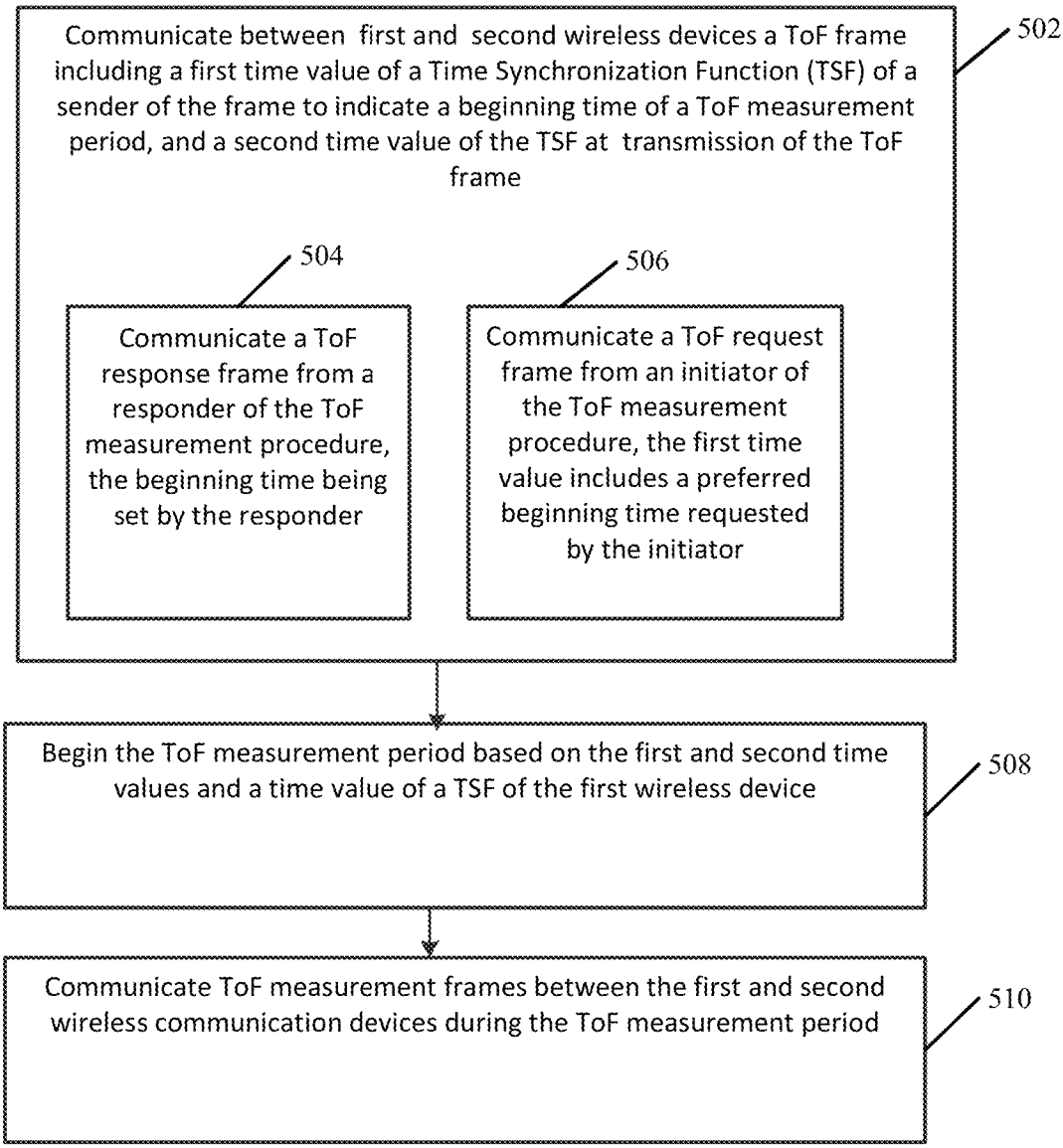
FIG. 5 is a schematic flow-chart illustration of a method of performing a Time of Flight (ToF) measurement, in accordance with some demonstrative embodiments.

Reference is made to FIG. 5, which schematically illustrates a method of performing a ToF measurement, in accordance with some demonstrative embodiments. For example, one or more of the operations of the method of FIG. 5 may be performed by a wireless communication system, e.g., system 100 (FIG. 1); a wireless communication device, e.g., devices 102 and/or 140 (FIG. 1); a controller, e.g., controllers 124 and/or 154 (FIG. 1); a radio, e.g., radios 114 and/or 144 (FIG. 1); a transmitter, e.g., transmitters 118 and/or 148 (FIG. 1); and/or a receiver, e.g., receivers 116 and/or 146 (FIG. 1).

As indicated at block 502, the method may include communicating a ToF frame between first and second wireless devices, the ToF frame including a first time value of a Time Synchronization Function (TSF) of a sender of the frame to indicate a beginning time of a ToF measurement period, and a second time value of the TSF at transmission of the ToF frame. For example, radios 114 and 144 (FIG. 1) may communicate the ToF frame including fields 404 and 406 (FIG. 4), e.g., as described above.

As indicated at block 504, communicating the ToF frame may include communicating a ToF response frame from a responder of the ToF measurement procedure, and setting the beginning time by the responder. For example, device 140 (FIG. 1) may set the beginning time of the ToF measurement period, and radios 114 and 144 (FIG. 1) may communicate ToF response message 149 (FIG. 1) including field 404 (FIG. 4), which includes the time value of TSF 156 (FIG. 1) at transmission of frame 149 (FIG. 1), and filed 406 (FIG. 1) including a time value of TSF 156 (FIG. 1) at beginning time 256 (FIG. 2), e.g., as described above.

As indicated at block 506, communicating the ToF frame may include communicating a ToF request frame from an initiator of the ToF measurement procedure and the first time value includes a preferred beginning time requested by the initiator. For example, radios 114 and 144 (FIG. 1) may communicate ToF request message 139 (FIG. 1), including field 404 (FIG. 4), which includes the time value of TSF 126 (FIG. 1) at transmission of frame 139 (FIG. 1), and filed 406 (FIG. 1) including a time value of TSF 156 (FIG. 1) corresponding to the preferred beginning time, e.g., as described above.

As indicated at block 508, the method may include beginning the ToF measurement period based on the first and second time values and a time value of a TSF of the first wireless device. For example, device 102 (FIG. 1) may begin the ToF measurement period 252 (FIG. 2) based on the beginning time value, e.g., of field 406 (FIG. 4), and the local time value, e.g., of field 404 (FIG. 4), in ToF response message 149 (FIG. 1) and the TSF value of TSF 126 (FIG. 1), e.g., as described above.

As indicated at block 510, the method may include communicating ToF measurement frames between the first and second wireless communication devices during the ToF measurement period. For example, radios 114 and 144 (FIG. 1) may communicate the ToF measurement frames during the ToF measurement period, e.g., as described above.

Figure 6:
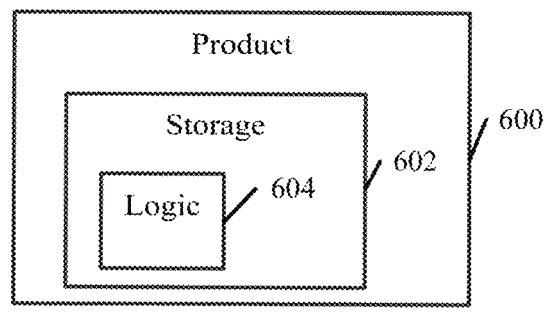
FIG. 6 is a schematic illustration of a product, in accordance with some demonstrative embodiments.

Reference is made to FIG. 6, which schematically illustrates a product of manufacture 500, in accordance with some demonstrative embodiments. Product 600 may include a non-transitory machine-readable storage medium 602 to store logic 604, which may be used, for example, to perform at least part of the functionality of devices 102 and/or 140 (FIG. 1), radios 114 and/or 144 (FIG. 1), transmitters 118 and/or 148 (FIG. 1), receivers 116 and/or 146 (FIG. 1), controllers 124 and/or 154 (FIG. 1), and/or to perform one or more operations of the method of FIG. 5. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a first wireless device comprising a controller to perform a Time of Flight (ToF) measurement procedure with a second wireless device; and a radio to communicate with the second wireless device a ToF frame including a first time value of a Time Synchronization Function (TSF) of a sender of the frame to indicate a beginning time of a ToF measurement period, and a second time value of the TSF at transmission of the ToF frame.

Example 2 includes the subject matter of Example 1, and optionally, wherein the first time value includes a first value of a portion of the TSF, and the second time value includes a second value of the portion of the TSF.

Example 3 includes the subject matter of Example 1 or 2, and optionally, wherein the first time value includes a partial TSF timer.

Example 4 includes the subject matter of any one of Examples 1-3, and optionally, wherein the ToF frame includes a burst timeout value to indicate a duration of the ToF measurement period.

Example 5 includes the subject matter of any one of Examples 1-4, and optionally, wherein the ToF frame includes a repetition indication to indicate a number of repetitions of the ToF measurement period.

Example 6 includes the subject matter of any one of Examples 1-5, and optionally, wherein the ToF frame includes a ToF response frame from a responder of the ToF measurement procedure, the beginning time being set by the responder.

Example 7 includes the subject matter of any one of Examples 1-5, and optionally, wherein the ToF frame includes a ToF request frame from an initiator of the ToF measurement procedure, the first time value includes a preferred beginning time requested by the initiator.

Example 8 includes the subject matter of any one of Examples 1-7, and optionally, wherein the ToF frame includes a Fine Timing Measurement (FTM) frame, and the ToF measurement procedure includes an FTM procedure.

Example 9 includes the subject matter of any one of Examples 1-8, and optionally, wherein the radio is to transmit the ToF frame.

Example 10 includes the subject matter of any one of Examples 1-8, and optionally, wherein the radio is to receive the ToF frame.

Example 11 includes the subject matter of Example 10, and optionally, wherein the controller is to begin the ToF measurement period based on the first and second time values and a time value of a TSF of the first wireless device.

Example 12 includes the subject matter of any one of Examples 1-11, and optionally, comprising one or more antennas; a memory; and a processor.

Example 13 includes a method to be performed by a first wireless device, the method comprising communicating with a second wireless device a ToF frame including a first time value of a Time Synchronization Function (TSF) of a sender of the frame to indicate a beginning time of a ToF measurement period, and a second time value of the TSF at transmission of the ToF frame; and communicating ToF measurement frames between the first and second wireless communication devices during the ToF measurement period.

Example 14 includes the subject matter of Example 13, and optionally, wherein the first time value includes a first value of a portion of the TSF, and the second time value includes a second value of the portion of the TSF.

Example 15 includes the subject matter of Example 13 or 14, and optionally, wherein the first time value includes a partial TSF timer.

Example 16 includes the subject matter of any one of Examples 13-15, and optionally, wherein the ToF frame includes a burst timeout value to indicate a duration of the ToF measurement period.

Example 17 includes the subject matter of any one of Examples 13-16, and optionally, wherein the ToF frame includes a repetition indication to indicate a number of repetitions of the ToF measurement period.

Example 18 includes the subject matter of any one of Examples 13-17, and optionally, wherein the ToF frame includes a ToF response frame from a responder of the ToF measurement procedure, the beginning time being set by the responder.

Example 19 includes the subject matter of any one of Examples 13-17, and optionally, wherein the ToF frame includes a ToF request frame from an initiator of the ToF measurement procedure, the first time value includes a preferred beginning time requested by the initiator.

Example 20 includes the subject matter of any one of Examples 13-19, and optionally, wherein the ToF frame includes a Fine Timing Measurement (FTM) frame, and the ToF measurement procedure includes an FTM procedure.

Example 21 includes the subject matter of any one of Examples 13-20, and optionally, comprising transmitting the ToF frame.

Example 22 includes the subject matter of any one of Examples 13-20, and optionally, comprising receiving the ToF frame.

Example 23 includes the subject matter of Example 22, and optionally, comprising beginning the ToF measurement period based on the first and second time values and a time value of a TSF of the first wireless device.

Example 24 includes a system of wireless communication comprising a first wireless communication device including one or more antennas; a memory; a processor; a controller to perform a Time of Flight (ToF) measurement procedure with a second wireless device; and a radio to communicate with the second wireless device a ToF frame including a first time value of a Time Synchronization Function (TSF) of a sender of the frame to indicate a beginning time of a ToF measurement period, and a second time value of the TSF at transmission of the ToF frame.

Example 25 includes the subject matter of Example 24, and optionally, wherein the first time value includes a first value of a portion of the TSF, and the second time value includes a second value of the portion of the TSF.

Example 26 includes the subject matter of Example 24 or 25, and optionally, wherein the first time value includes a partial TSF timer.

Example 27 includes the subject matter of any one of Examples 24-26, and optionally, wherein the ToF frame includes a burst timeout value to indicate a duration of the ToF measurement period.

Example 28 includes the subject matter of any one of Examples 24-27, and optionally, wherein the ToF frame includes a repetition indication to indicate a number of repetitions of the ToF measurement period.

Example 29 includes the subject matter of any one of Examples 24-28, and optionally, wherein the ToF frame includes a ToF response frame from a responder of the ToF measurement procedure, the beginning time being set by the responder.

Example 30 includes the subject matter of any one of Examples 24-29, and optionally, wherein the ToF frame includes a ToF request frame from an initiator of the ToF measurement procedure, the first time value includes a preferred beginning time requested by the initiator.

Example 31 includes the subject matter of any one of Examples 24-30, and optionally, wherein the ToF frame includes a Fine Timing Measurement (FTM) frame, and the ToF measurement procedure includes an FTM procedure.

Example 32 includes the subject matter of any one of Examples 24-31, and optionally, wherein the radio is to transmit the ToF frame.

Example 33 includes the subject matter of any one of Examples 24-31, and optionally, wherein the radio is to receive the ToF frame.

Example 34 includes the subject matter of Example 33, and optionally, wherein the controller is to begin the ToF measurement period based on the first and second time values and a time value of a TSF of the first wireless device.

Example 35 includes a product including one or more tangible computer-readable non-transitory storage media comprising computer-executable instructions operable to, when executed by at least one computer processor, enable the at least one computer processor to implement a method at a first wireless device, the method comprising communicating with a second wireless device a ToF frame including a first time value of a Time Synchronization Function (TSF) of a sender of the frame to indicate a beginning time of a ToF measurement period, and a second time value of the TSF at transmission of the ToF frame; and communicating ToF measurement frames between the first and second wireless communication devices during the ToF measurement period.

Example 36 includes the subject matter of Example 35, and optionally, wherein the first time value includes a first value of a portion of the TSF, and the second time value includes a second value of the portion of the TSF.

Example 37 includes the subject matter of Example 35 or 36, and optionally, wherein the first time value includes a partial TSF timer.

Example 38 includes the subject matter of any one of Examples 35-37, and optionally, wherein the ToF frame includes a burst timeout value to indicate a duration of the ToF measurement period.

Example 39 includes the subject matter of any one of Examples 35-38, and optionally, wherein the ToF frame includes a repetition indication to indicate a number of repetitions of the ToF measurement period.

Example 40 includes the subject matter of any one of Examples 35-39, and optionally, wherein the ToF frame includes a ToF response frame from a responder of the ToF measurement procedure, the beginning time being set by the responder.

Example 41 includes the subject matter of any one of Examples 35-40, and optionally, wherein the ToF frame includes a ToF request frame from an initiator of the ToF measurement procedure, the first time value includes a preferred beginning time requested by the initiator.

Example 42 includes the subject matter of any one of Examples 35-41, and optionally, wherein the ToF frame includes a Fine Timing Measurement (FTM) frame, and the ToF measurement procedure includes an FTM procedure.

Example 43 includes the subject matter of any one of Examples 35-42, and optionally, wherein the method comprises transmitting the ToF frame.

Example 44 includes the subject matter of any one of Examples 35-42, and optionally, wherein the method comprises receiving the ToF frame.

Example 45 includes the subject matter of Example 44, and optionally, wherein the method comprises beginning the ToF measurement period based on the first and second time values and a time value of a TSF of the first wireless device.

Example 46 includes a first wireless device comprising means for communicating with a second wireless device a ToF frame including a first time value of a Time Synchronization Function (TSF) of a sender of the frame to indicate a beginning time of a ToF measurement period, and a second time value of the TSF at transmission of the ToF frame; and means for communicating ToF measurement frames between the first and second wireless communication devices during the ToF measurement period.

Example 47 includes the subject matter of Example 46, and optionally, wherein the first time value includes a first value of a portion of the TSF, and the second time value includes a second value of the portion of the TSF.

Example 48 includes the subject matter of Example 46 or 47, and optionally, wherein the first time value includes a partial TSF timer.

Example 49 includes the subject matter of any one of Examples 46-48, and optionally, wherein the ToF frame includes a burst timeout value to indicate a duration of the ToF measurement period.

Example 50 includes the subject matter of any one of Examples 46-49, and optionally, wherein the ToF frame includes a repetition indication to indicate a number of repetitions of the ToF measurement period.

Example 51 includes the subject matter of any one of Examples 46-50, and optionally, wherein the ToF frame includes a ToF response frame from a responder of the ToF measurement procedure, the beginning time being set by the responder.

Example 52 includes the subject matter of any one of Examples 46-51, and optionally, wherein the ToF frame includes a ToF request frame from an initiator of the ToF measurement procedure, the first time value includes a preferred beginning time requested by the initiator.

Example 53 includes the subject matter of any one of Examples 46-52, and optionally, wherein the ToF frame includes a Fine Timing Measurement (FTM) frame, and the ToF measurement procedure includes an FTM procedure.

Example 54 includes the subject matter of any one of Examples 46-53, and optionally, comprising means for transmitting the ToF frame.

Example 55 includes the subject matter of any one of Examples 46-53, and optionally, comprising means for receiving the ToF frame.

Example 56 includes the subject matter of Example 55, and optionally, comprising means for beginning the ToF measurement period based on the first and second time values and a time value of a TSF of the first wireless device.

Functions, operations, components and/or features described herein with reference to one or more embodiments, may be combined with, or may be utilized in combination with, one or more other functions, operations, components and/or features described herein with reference to one or more other embodiments, or vice versa.

While certain features of have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A first wireless device comprising:
   a controller configured to perform a Time of Flight (ToF) measurement procedure with a second wireless device; and
   a radio configured to receive a ToF frame from the second wireless device, the ToF frame including a first time value of a Time Synchronization Function (TSF) timer of said second wireless device and a second time value of the TSF timer of the second wireless device, the first time value comprising an indicated beginning time of a ToF measurement period, the second time value comprising a value of the TSF timer of the second wireless device at transmission of said ToF frame from the second wireless device,
   wherein the controller is to begin said ToF measurement period at a calculated beginning time, which is based on the first time value, the second time value and a third time value, the third time value comprising a value of a TSF timer of said first wireless device.

2. The first wireless device of claim 1, wherein said first time value includes a first value of a portion of the TSF timer of the second wireless device, and said second time value includes a second value of the portion of the TSF timer of the second wireless device.

3. The first wireless device of claim 1, wherein said first time value includes a partial TSF timer value of the TSF timer of the second wireless device.

4. The first wireless device of claim 1, wherein said ToF frame includes a burst timeout value to indicate a duration of said ToF measurement period.

5. The first wireless device of claim 1, wherein said ToF frame includes a repetition indication to indicate a number of repetitions of said ToF measurement period.

6. The first wireless device of claim 1, wherein said ToF frame includes a ToF response frame from a responder of said ToF measurement procedure, said indicated beginning time to be set by said responder.

7. The first wireless device of claim 1, wherein said ToF frame includes a ToF request frame from an initiator of said ToF measurement procedure, said first time value includes a preferred beginning time requested by said initiator.

8. The first wireless device of claim 1, wherein the ToF frame includes a Fine Timing Measurement (FTM) frame, and said ToF measurement procedure includes an FTM procedure.

9. The first wireless device of claim 1, wherein said third time value comprises a value of the TSF timer of the first wireless device at reception of the ToF frame at the first wireless device.

10. The first wireless device of claim 1, wherein said controller is to determine the calculated beginning time based on a subtraction of the second time value from a sum of the first time value and the third time value.

11. A method to be performed by a first wireless device, the method comprising:
    receiving a Time of Flight (ToF) frame from a second wireless device, the ToF frame including a first time value of a Time Synchronization Function (TSF) timer of said second wireless device and a second time value of the TSF timer of the second wireless device, the first time value comprising an indicated beginning time of a ToF measurement period, the second time value comprising a value of the TSF timer of the second wireless device at transmission of said ToF frame from the second wireless device;
    determining a calculated beginning time of the ToF measurement period based on the first time value, the second time value and a third time value, the third time value comprising a value of a TSF timer of said first wireless device; and
    based on the calculated beginning time, communicating ToF measurement frames between said first and second wireless communication devices during said ToF measurement period.

12. The method of claim 11, wherein said first time value includes a first value of a portion of the TSF timer of the second wireless device, and said second time value includes a second value of the portion of the TSF timer of the second wireless device.

13. The method of claim 11, wherein said ToF frame includes a ToF response frame from a responder of said ToF measurement procedure, said indicated beginning time to be set by said responder.

14. The method of claim 11, wherein said ToF frame includes a ToF request frame from an initiator of said ToF measurement procedure, said first time value includes a preferred beginning time requested by said initiator.

15. A system of wireless communication comprising:
a first wireless communication device including:
- one or more antennas;
- a memory;
- a processor;
- a controller to perform a Time of Flight (ToF) measurement procedure with a second wireless communication device; and
- a radio to receive a ToF frame from the second wireless device, the ToF frame including a first time value of a Time Synchronization Function (TSF) timer of said second wireless device and a second time value of the TSF timer of the second wireless device, the first time value comprising an indicated beginning time of a ToF measurement period, the second time value comprising a value of the TSF timer of the second wireless device at transmission of said ToF frame from the second wireless device,
- wherein the controller is to begin said ToF measurement period at a calculated beginning time, which is based on the first time value, the second time value and a third time value, the third time value comprising a value of a TSF timer of said first wireless device.

16. The system of claim 15, wherein said first time value includes a first value of a portion of the TSF timer of the second wireless device, and said second time value includes a second value of the portion of the TSF timer of the second wireless device.

17. The system of claim 15, wherein said ToF frame includes a ToF response frame from a responder of said ToF measurement procedure, said indicated beginning time to be set by said responder.

18. The system of claim 15, wherein said ToF frame includes a ToF request frame from an initiator of said ToF measurement procedure, said first time value includes a preferred beginning time requested by said initiator.

19. A product including one or more tangible computer-readable non-transitory storage media comprising computer-executable instructions operable to, when executed by at least one computer processor, enable the at least one computer processor to cause a first wireless device to:
- receive a Time of Flight (ToF) frame from a second wireless device, the ToF frame including a first time value of a Time Synchronization Function (TSF) timer of said second wireless device and a second time value of the TSF timer of the second wireless device, the first time value comprising an indicated beginning time of a ToF measurement period, the second time value comprising a value of the TSF timer of the second wireless device at transmission of said ToF frame from the second wireless device;
- determine a calculated beginning time of the ToF measurement period based on the first time value, the second time value and a third time value, the third time value comprising a value of a TSF timer of said first wireless device; and
- based on the calculated beginning time, communicate ToF measurement frames between said first and second wireless communication devices during said ToF measurement period.

20. The product of claim 19, wherein said first time value includes a first value of a portion of the TSF timer of the second wireless device, and said second time value includes a second value of the portion of the TSF timer of the second wireless device.

21. The product of claim 19, wherein said ToF frame includes a ToF response frame from a responder of said ToF measurement procedure, said indicated beginning time to be set by said responder.

22. The product of claim 19, wherein said ToF frame includes a ToF request frame from an initiator of said ToF measurement procedure, said first time value includes a preferred beginning time requested by said initiator.

23. The product of claim 19, wherein said third time value comprises a value of the TSF timer of the first wireless device at reception of the ToF frame at the first wireless device.

24. The product of claim 19, wherein the instructions, when executed, cause the first wireless device to determine the calculated beginning time based on a subtraction of the second time value from a sum of the first time value and the third time value.

* * * * *